Aug. 8, 1933.  J. FREI, JR  1,921,614
ILLUMINATED ARTIFICIAL PLANT
Filed July 3, 1931
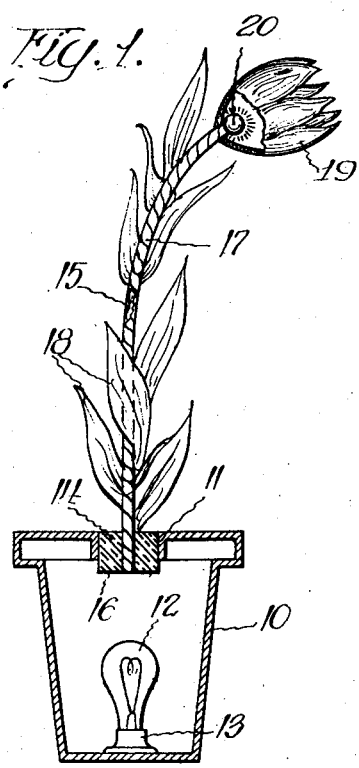
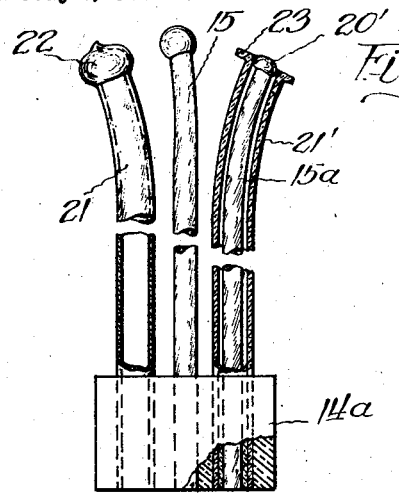
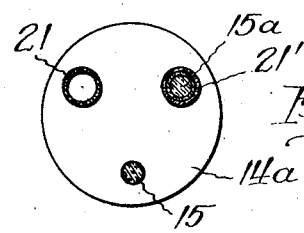
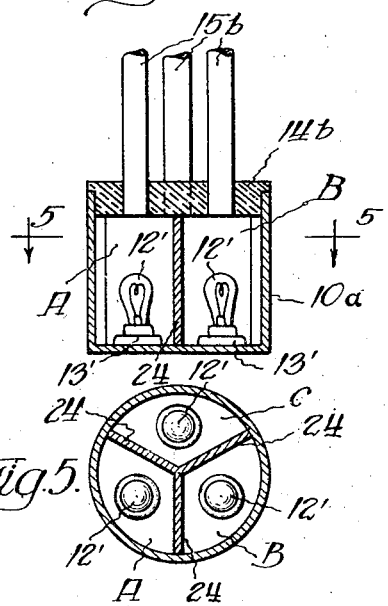
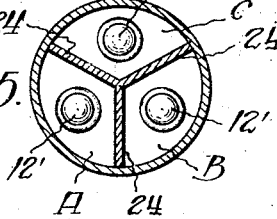
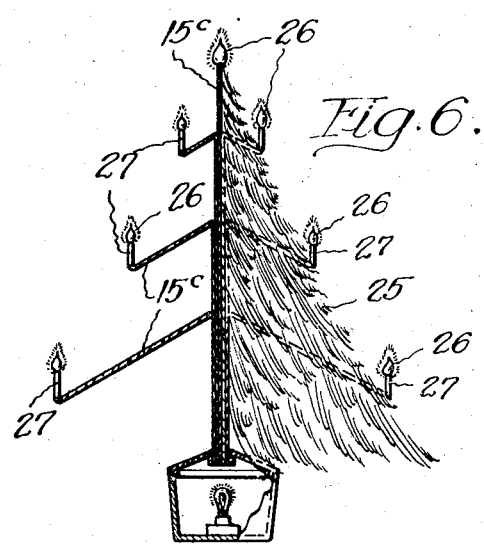
Inventor:
John Frei, Jr.

Patented Aug. 8, 1933

1,921,614

UNITED STATES PATENT OFFICE 1,921,614

ILLUMINATED ARTIFICIAL PLANT

John Frei, Jr., Chicago, Ill.

Application July 3, 1931. Serial No. 548,538

4 Claims. (Cl. 240—10)

This invention relates to illuminated artificial plants or the like.

Broadly stated, the main feature of this invention resides in the provision of means for illuminating artificial plants or the like so that such articles will present a novel and pleasing appearance.

More specifically, the invention contemplates the illumination of an artificial plant indirectly from a suitable source of light. This source of light is substantially sealed in a suitable receptacle from the top of which projects suitable light transmitting elements. These elements, in addition to performing the foregoing function, also form parts of the plant and support the objects to be illuminated.

Other objects and advantages of my invention will appear from the following detailed description, when taken in connection with the accompanying drawing, in which:

Figure 1 is a vertical sectional view of an artificial flower embodying the features of my invention;

Figure 2 is a view partly in vertical section of a modified form of the light transmitting elements;

Figure 3 is a bottom view of the device shown in Figure 2;

Figure 4 is a vertical sectional view of a modified form of device;

Figure 5 is a sectional view taken substantially along the line 5—5 of Figure 4; and Figure 6 is a view of an artificial Christmas tree embodying the features of my invention and with the decorations removed from one side thereof.

Referring to the drawing, the numeral 10 indicates a receptacle which, in practice, may be in the form of an ornamental vase and which is preferably constructed of a substantially opaque and non-heat conducting material such as porcelain, although it may be constructed of any other suitable material. The top of this receptacle is closed except for an opening 11 which is of sufficient size to permit of the ready insertion or removal of an electric light bulb 12. This bulb 12 is screwed into an electric light socket 13 which is disposed in and secured to the bottom of the receptacle in any suitable or preferred manner.

A stopper 14 fits into and seals the opening 11 in the receptacle 10. This stopper is preferably formed of hard rubber or similar material, and is bored for the reception of light transmitting elements in the form of glass rods 15. These rods, which are firmly held at one end in the stopper, terminate substantially flush with the under surface 16 thereof. Rods 15, in addition to constituting light transmitting elements, form a part of the plant and support the object to be illuminated.

In Figure 1, I have shown my invention embodied in the form of an artificial flower. In this form the rod 15 is wrapped with suitable material 17 colored to simulate the appearance of the stem of a flower. A plurality of artificial leaves 18 and an artificial flower 19 are also secured to rod 15, the end of the rod upon which the flower is secured terminating in a glass ball 20, disk, or other suitably shaped element, depending upon the type of flower used. This ball or disk is appropriately colored to simulate the pollen of the flower. When light bulb 12 is illuminated, the light rays emanating therefrom will pass upwardly through the rods 15 and illuminate the flower 19. The material 17 used for wrapping the rod 15 may, if desired, be of such quality as to permit the rays of light to be transmitted dimly therethrough.

The rods 15 are formed of ordinary commercial glass, and the outer surfaces of these rods are not highly polished or otherwise treated to impart exceptional smoothness thereto. Ordinary commercial glass is not of uniform density which, in conjunction with the lack of exceptional smoothness of the outer surfaces of the rods and, possibly other imperfections which exist in ordinary commercial glass, render the rods light diffusing so as to illuminate the material 17 as stated, when this material is translucent or permeable to light rays. It may be that there are other reasons why the rods are light diffusing, but in any event I employ rods which diffuse the light in the manner and for the reasons stated.

While I prefer to employ glass rods for the light transmitting elements, I do not intend to limit myself to the use of such rods, since glass tubes may be used to good effect. In Figures 2 and 3, I have shown a tube 21 terminating at one end in a glass ball 22 and secured at its other end in a stopper 14ª, in the same manner hereinbefore described in connection with the rod 15. The tubes and rods may also be used in combination with each other, as illustrated, for example, at the right in Figure 2, wherein the glass rod 15ª is enclosed by a tube 21', both the rod and the tube being secured in the rubber stopper 14ª. In this instance the rod 15ª terminates in a glass ball 20' and the tube 21' terminates in a disk 23, the ball and disk being painted in contrasting colors to suit the species of flower used. The rays of light, in this instance, travel up the glass rod 15ª and the walls of the tube 21' to illuminate the glass ball 20' and the disk 23, respectively.

In Figures 4 and 5, I have illustrated a receptacle 10ª divided into a plurality of light tight compartments,—in this instance, three, A, B and C, by means of partitions 24, these partitions being secured in the receptacle in any suitable or preferred manner. Each of these compartments encloses an electric light socket 13' adapted for the reception of a colored light bulb 12', the light bulbs of each compartment being of a different color. Each of the compartments also has light transmitting elements 15ᵇ communicating therewith, these elements being secured in the stopper 14ᵇ, in the manner hereinbefore described. The colored rays of light emanating from the differently colored bulbs pass upwardly through the associated light transmitting elements so as to illuminate the same in different colors, producing a decidedly novel and pleasing effect. In this form the elements or rods 15ᵇ are not shown as covered with an opaque or translucent coating, as in the form of Figure 1, though these rods may be provided with such a covering or not, as desired, or as conditions may require.

In Figure 6, I have illustrated an illuminated artificial Christmas tree constructed in accordance with the principles of my invention. In this instance, as in the case of the hereinbefore described flower, a plurality of light transmitting rods 15ᶜ serve as a framework to which the decorations 25 may be secured. Each of these rods is shaped at its outer end 26 to simulate a small electric light bulb such as is commonly used to illuminate Christmas trees. The portion 27 of the rods, just below the portion 26, may be provided with a covering of colored transparent or translucent material, such as red, green or blue celluloid or the like, and the remainder of the rod is wrapped with metal foil, or other suitable opaque material having the reflective qualities of tin foil. Over the tin foil is then applied a wrapping of material that will give to the rods the appearance of the branches of a tree. It is not essential that the rods be wrapped with foil, but I find this desirable as providing a strengthening or bracing means for the rods. Also, the foil provides a reflecting surface which facilitates passage of the light through the rod to the upper end thereof.

The covering of portion 27 of the rod is illuminated by the light diffused by this portion of the rod, in the same manner as covering 17 in Figure 1, when permeable to light rays, is illuminated by light diffused by the rod 15.

While I have shown incandescent lamps as the light source, it is to be understood that I do not intend to limit myself to the use of such lamps, as any suitable source of light may be used.

Although preferred embodiments of my invention have been illustrated and described, by way of example, it will be obvious that changes may be made therein within the spirit and scope of the invention, and, therefore, I do not limit my invention to the forms thereof herein disclosed except insofar as it may be so limited in the appended claims.

What I claim is:

1. In a device of the class described, a receptacle, a plant mounted upon said receptacle and comprising a glass rod and a tube surrounding said rod, said rod terminating at one end in a ball and said tube terminating at one end in a disk, the tube and the rod being in light transmitting communication with the receptacle, and a source of light enclosed within said receptacle, the rays of light from said light source passing through said rod and the walls of said tube to illuminate said plant.

2. In a device of the character described, a source of light, a light transmitting rod in light conducting relation to said light source and comprising a light transmitting portion, a light transmitting and light diffusing portion extending from said light transmitting portion, and a terminal element extending from said transmitting and diffusing portion, said terminal element being shaped to in part diffuse the light rays and to concentrate the light rays at one portion of the terminal element to a greater extent that at other portions thereof, whereby one portion of the terminal element is illuminated to a greater extent than other portions thereof.

3. In a device of the character described, a source of light, a light transmitting and light diffusing rod in light conducting relation to said light source, a light diffusing covering extending about said rod, and a terminal element at one end of the rod, said element receiving light rays from the rod and having its outer surface smooth, the terminal element being shaped to diffuse the light rays received thereby from the rod.

4. In a device of the character described, a source of light, a light transmitting rod in light conducting relation to said light source and comprising a straight light transmitting portion, a straight light transmitting and light diffusing portion at an angle to the light transmitting portion, and a terminal element extending from said transmitting and diffusing portion, said terminal element being shaped to in part diffuse the light rays and to concentrate the light rays at one portion of the terminal element to a greater extent than at other portions thereof, whereby one portion of the terminal element is illuminated to a greater extend than other portions thereof

JOHN FREI, JR.